2 Sheets—Sheet 1.
O. P. REEVE.
Bee Hive.
No. 45,859.
Patented Jan. 10, 1865.
Section 1
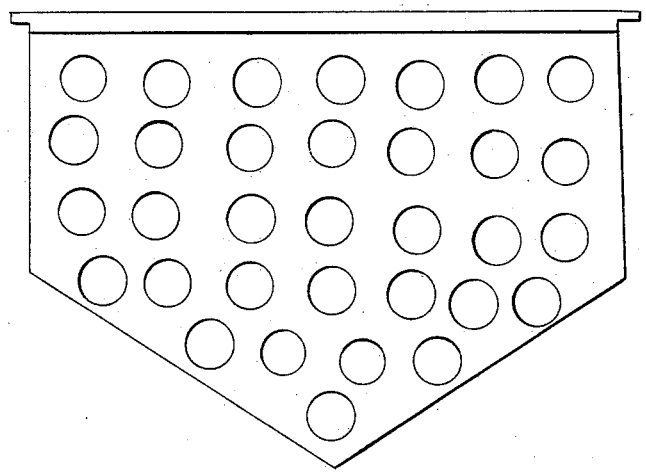
Section 2
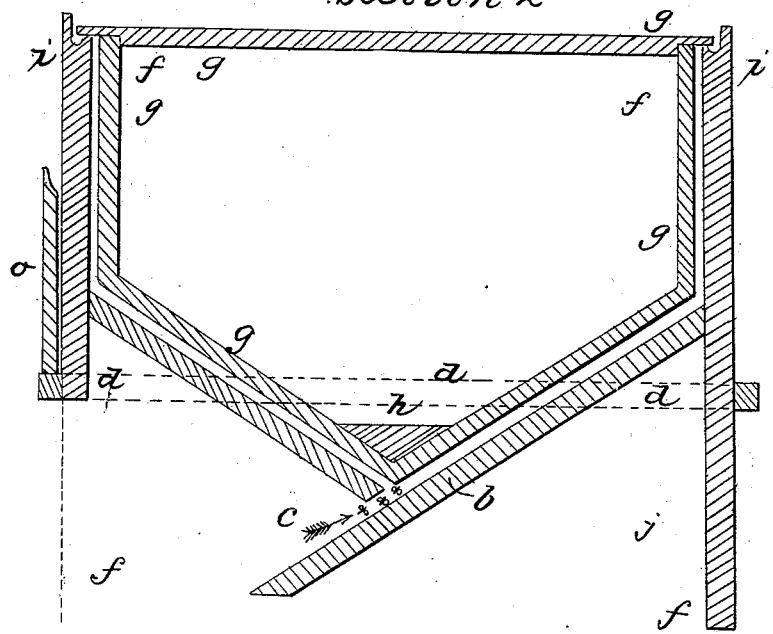
WITNESSES
George Bolton
Wm. C. Piatt
INVENTOR
Oliver P. Reeve

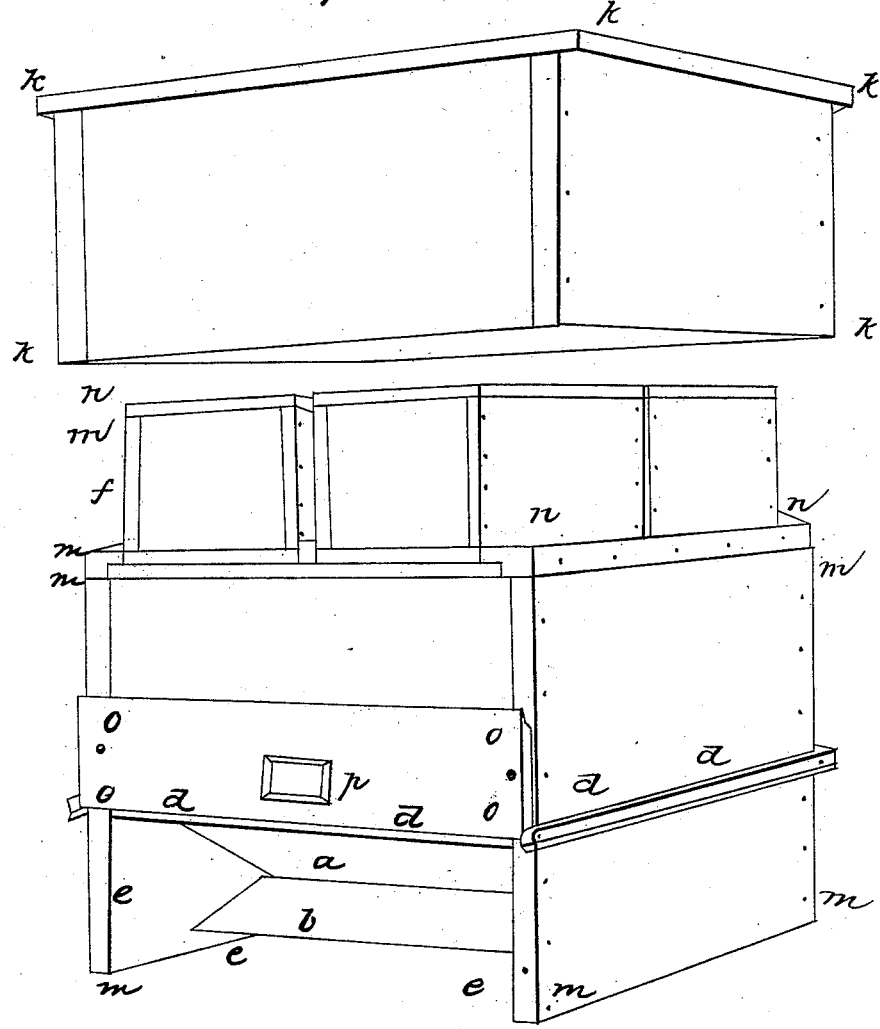

UNITED STATES PATENT OFFICE.

OLIVER P. REEVE, OF TIPTON, IOWA.

IMPROVEMENT IN BEE-HIVES.

Specification forming part of Letters Patent No. 45,859, dated January 10, 1865.

*To all whom it may concern:*

Be it known that I, OLIVER P. REEVE, of Tipton, Cedar county, Iowa, have invented an Improvement in Bee-Hives; and I do hereby declare that the following is a full and exact description thereof, reference being had to the accompanying drawings and letters of reference marked thereon.

The nature of my invention consists in constructing, arranging, and combining the different parts of my bee-hive, as herein described, so as to thoroughly protect the bees from moths and vermin, to afford them a shady lighting-place and a comfortable dwelling in both summer and winter, adapted to their wants and habits.

The comb-guides of punctured pasteboard are to cause the bees to build straight and regular combs.

The double-inclined-plane bottom is for the purpose of easily expelling offensive matter, in combination with the frames, and to prevent moths and worms from entering the hive by the use of the moth apartment, to which they will naturally go in preference to entering the honey apartment, and to give the bees a more ready entrance, and to shade and protect the entrance.

To enable others to make and use my invention, I will proceed to describe my invention and its construction and operation.

The hive is constructed as shown on Plate 1.

$k\ k\ k\ k$ represent the super or cap. As shown on the plate, it is raised above the hive, thus exhibiting the top of the honey-hive and surplus honey-boxes.

$m\ m\ m\ m$ represent the honey-hive or bee-hive proper. When the super or cap is placed on, it fits over the upper part of this hive so as to rest on the surplus honey-boxes, or upon the top of the hive when they are removed, or on the sides or handles.

This hive in all its parts may be built of any suitable material, and of any size to suit the builder. In the bottom of the honey-hive or hive proper are two inclined planes, which form the bottom, as shown on Plate 1; also, an end sectional view of these planes is shown on Plate 2, Section 2. They are shown on Plate 1 by letters $a$ and $b$, and the same on Plate 2. These planes begin about midway up the front and back sides in the interior of the hive and incline downward, the front plane extending to about the center of the hive, leaving a space of about one inch between it and the back plane for an entrance for the bees, as shown by $c$ on Plate 2, Section 2. The back or rear plane extends past this point toward the front entrance, so as to form a lighting-board, as shown by letter $b$ on both plates.

The space below the dotted lines $d\ d$ represents the extent of the entrance, as is also shown by $e\ e\ e\ e$ on Plate 1. The letters $d\ d\ d$ also show the rider surrounding the hive, which serves the purpose of handling the hive and sustaining the super or cap when closed.

Letter $f$ on both plates represents the end or side of the hive, in front of which is represented the forms in Plate 2, Section 2.

The honey-frames are shown on Plate 2, Section 2, by the letters $g\ g\ g\ g$, with their form, construction, and application. They are formed in pieces, as there shown, and are sustained in the hive upon an edge to a groove in the side of the hive, as shown by letters $i\ i$. This is to prevent the bees from gumming the frames to the hive.

The brace-block is represented by letter $h$ on Plate 2, Section 2. This is to give the frames greater strength.

On the top of the hive $m\ m\ m\ m$ is shown four surplus honey-boxes, with the honey-board between them and the hive. The honey-board is represented by $n\ n\ n$.

The space $j$ on Plate 2, Section 2, represents the moth apartment, which is formed by the rear plane of the bottom, and is so arranged as to leave a space under the lower end of this plane $b$ at the front, that moths and millers and insects will enter and go into this apartment $j$ and build their nests, the same being out of the honey-hive, where they can do no harm.

The comb-guide is shown on Plate 2, being a perforated pasteboard sustained by a cross-stick at the top, like the honey-frames, so as to fit in the hive between the frames, so as to cause the bees to build straight and perfect comb.

$o\ o\ o\ o$ represent an entrance gate or door to the hive, which is here shown as suspended above the entrance by the screens, but in cold weather or winter to be taken off and placed over the front entrance, thus inclosing it, and when so inclosed the wire-cloth window $p$ will afford a circulation of air for the bees. This door or gate, in combination with the style and form of the open entrance to the hive, will afford the bees a protection against all destroying vermin in both summer and winter, and add to the comfort and security of the bees.

What I claim as my invention, and desire to secure by Letters Patent, is—

The arrangement of the comb-frame and comb-guides, constructed as described, in combination with the groove $i$, in the side of the hive, and the double-inclined bottom, substantially as and for the purposes specified.

O. P. REEVE.

Witnesses:
JAMES W. BAGLEY,
C. C. NESTLERODE.